United States Patent [19]
Golfier

[11] 3,728,542
[45] Apr. 17, 1973

[54] EQUIPMENT UNIT FOR X-RAY INSPECTION OF PNEUMATIC TIRES

[75] Inventor: Leon Golfier, Soisy-sous-Montmorency, France

[73] Assignee: Societe dite: Jubin S.A., Pantin (Seine Saint-Denis, France

[22] Filed: Mar. 8, 1972

[21] Appl. No.: 232,896

[30] Foreign Application Priority Data

Mar. 11, 1971 France..................................7108459

[52] U.S. Cl.....................250/52, 73/146, 250/65 R, 250/83.3 D, 250/97
[51] Int. Cl. ............................................G03b 41/16
[58] Field of Search........................250/52, 51, 65 R, 250/91, 92; 73/146

[56] References Cited

UNITED STATES PATENTS 3,550,443   12/1970   Sherkin..................................250/52

*Primary Examiner*—James W. Lawrence
*Assistant Examiner*—C. E. Church
*Attorney*—Irvin S. Thompson et al.

[57] ABSTRACT

A unit for the X-ray inspection of automotive vehicle tires which are inflated to their normal pressure, comprising a tire-gripping device having angularly spaced jaws adapted to slide radially with respect to the tire and mounted on a handling carriage for transferring tires from a feed conveyor to an inspection apparatus and then to a discharge conveyor.

The inspection apparatus comprises rotary discs mounted on a support for translational motion towards or away from the tire, annular shoulders being formed on the discs for pressure-tight engagement within the beads of tires of different sizes so as to define an enclosure which permits inflation with compressed air, an X-ray generating tube mounted within a sheath which is capable of passing through one disc in leak-tight manner, and a drive system for rotating the tire to be inspected.

10 Claims, 10 Drawing Figures

EQUIPMENT UNIT FOR X-RAY INSPECTION OF PNEUMATIC TIRES

This invention relates to an equipment unit for the X-ray inspection of pneumatic tires for the wheels of motor vehicles, and especially tires of the radial tread type comprising, beneath the tread base, a metallic belt which is usually known by the name of "breaker."

Inspection devices are known which comprise movable discs for supporting the pneumatic tire to be inspected, a device for driving the tire in rotation about its axis and a tube for generating X-rays.

However, these devices are designed to permit inspection solely of non-inflated tires. Under these conditions, flaws are liable to escape from inspection and then to appear when the tires are subjected to a pressure of air.

The primary object of the invention is to permit the inspection by X-rays of pneumatic tires which are inflated to their normal pressure.

It is a further aim of the invention to mechanize and to render automatic the different operations involving handling of the tire both before and after inspection from the time this latter is brought-in by a conveyor to the time it is discharged by another conveyor.

In accordance with the invention, the equipment unit for X-ray inspection of pneumatic tires, which comprises an inspection apparatus of the type specified in the foregoing, is distinguished by the fact that the movable discs are adapted respectively to each tire bead in the inspection position so as to define with said tire an enclosure which is leak-tight with respect to compressed air, that the tube for generating X-rays is mounted within the interior of a sheath which is leak-tight with respect to compressed air and at least part of which is permeable to X-rays, said sheath being adapted to slide parallel to the axis of the tire and to pass through one of the discs in such manner as to afford leak-tightness with respect to compressed air, and that a compressed-air pipe is adapted to traverse the aforementioned disc in leak-tight manner.

In accordance with a preferred characteristic feature of the invention, each of the discs is rotatably mounted with respect to a support which is displaceable in translational motion, a device being provided for driving these two supports simultaneously in translational motion and said device being so arranged that said supports remain symmetrical with each other with respect to the mid-plane of the tire in the position of inspection.

The pneumatic tire can thus be caused to rotate about the X-ray generator tube while maintaining a predetermined air pressure within the interior of said tire.

In accordance with a preferred characteristic feature of the invention, the inspection equipment unit comprises a tire feed conveyor, a tire discharge conveyor, and a tire-gripping device mounted on a handling carriage for transporting the tires from said conveyors to the inspection apparatus ; and the gripping device essentially comprises a plurality of jaws so arranged as to slide in a radial direction with respect to the tire, and a system for actuating said jaws which is so arranged that the distances between the axis of the tire and each of said jaws should remain equal to each other.

In one advantageous embodiment of the invention, the inspection apparatus comprises a rotary drum having a plurality of angularly spaced sets of two arms which are symmetrical with respect to the mid-plane of the tire in the inspection position and each carry a disc for supporting the tire, the discs which are carried respectively by each set of two arms having diameters which are different from each other.

It is thus possible to inspect with the same apparatus practically all tires of standard sizes by selecting the appropriate set of drum arms.

Further properties and advantages of the invention will now become apparent from the following description.

A number of embodiments of the invention are illustrated in the accompanying drawings which are given by way of non-limitative example, and in which.

Figure 2:
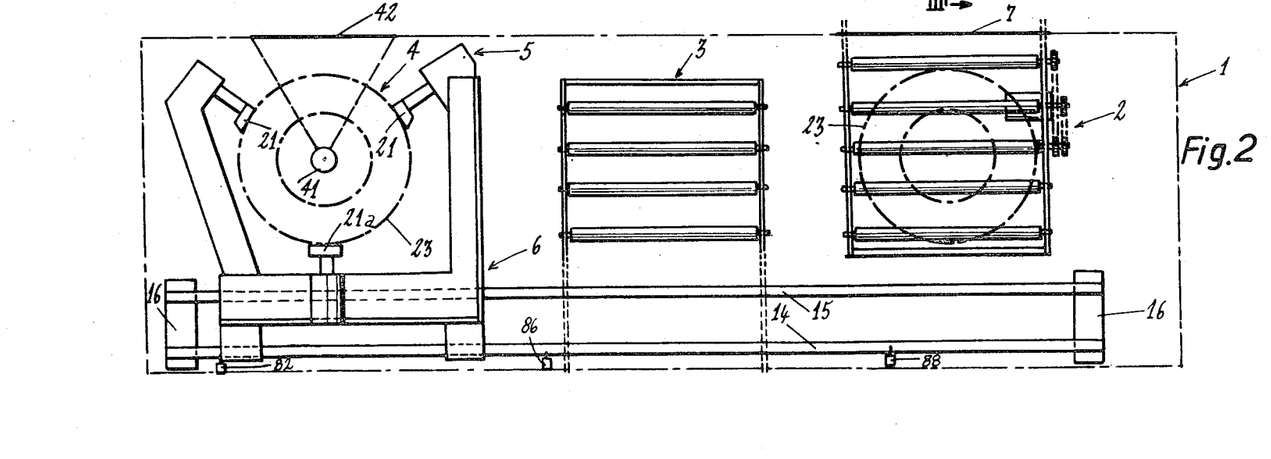
FIG. 2 is a plan view corresponding to FIG. 1.

The equipment unit according to the invention for the X-ray inspection of pneumatic tires is contained within a closed room, the walls of which are indicated schematically at 1 (in FIG. 2). This unit essentially comprises a feed conveyor 2 and a discharge conveyor 3 for the tires, an inspection apparatus 4 and a gripping device 5 (FIG. 2) which is mounted on a handling carriage 6 for transporting tires between the inspection apparatus 4 and the conveyors 2 and 3.

The walls 1 of the room are impermeable to X-rays and are of any suitable type which is known to those who are versed in the art.

Figure 3:
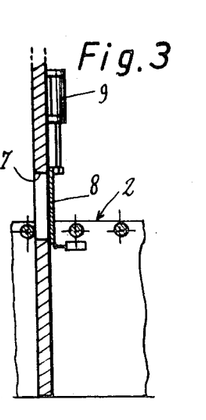
FIG. 3 is a partial sectional view taken along line III—III of FIG. 1.

The conveyors 2 and 3, which are of the roller type in the embodiment illustrated but can be of any other suitable type, are disposed in parallel relation and move forward in the same direction. The feed conveyor 2 traverses one of the walls 1 through an opening 7 (as shown in FIG. 3) which can be a shutter 8 of the sash type operated by a hydraulic jack 9. The discharge conveyor 3 passes through the opposite wall of the room by means of a similar system which is not illustrated.

The level of the rollers of the discharge conveyor 3 is lower than that of the rollers of the feed conveyor 2 in order that the gripping device 5 should be permitted to transport a tire from the feed conveyor 2 to the inspection apparatus 4 by passing above the discharge conveyor 3.

Figure 5:
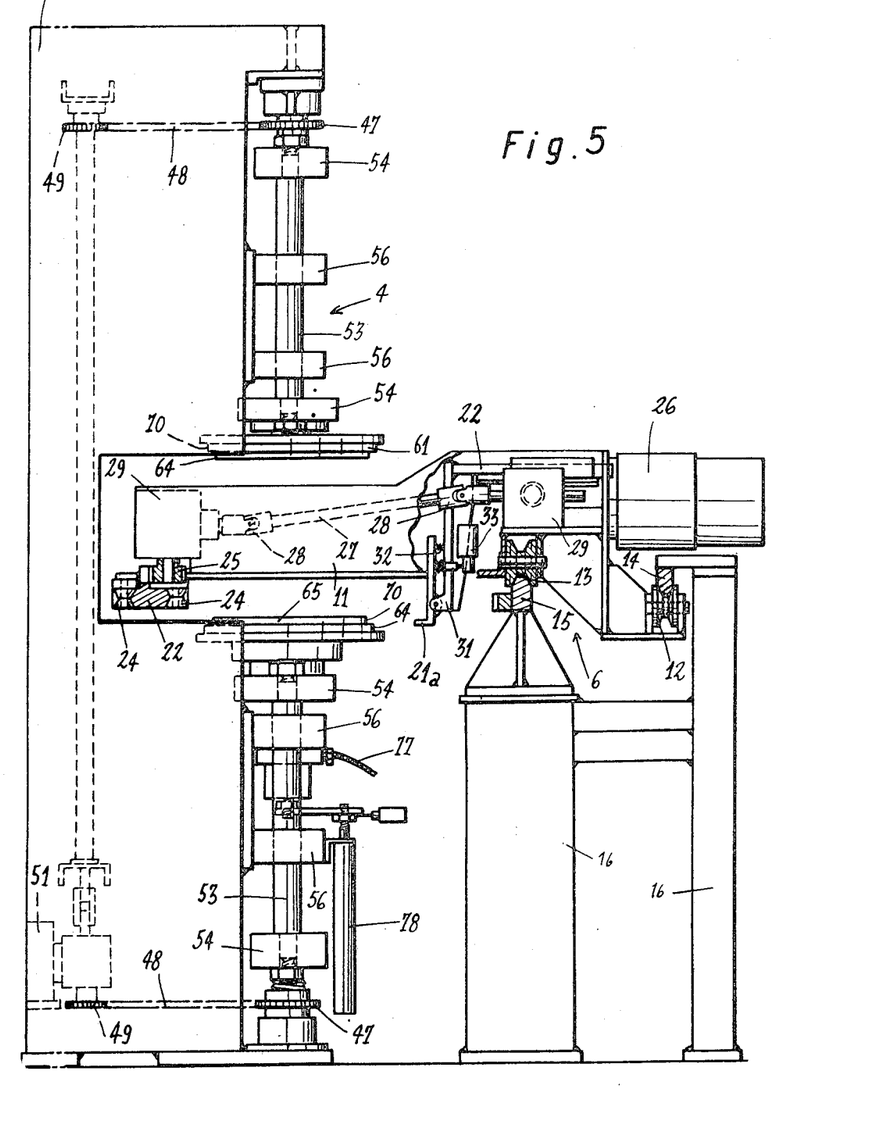
FIG. 5 is a lateral view taken along line V—V of FIG. 6 and showing the inspection apparatus of FIG. 4.
Figure 6:
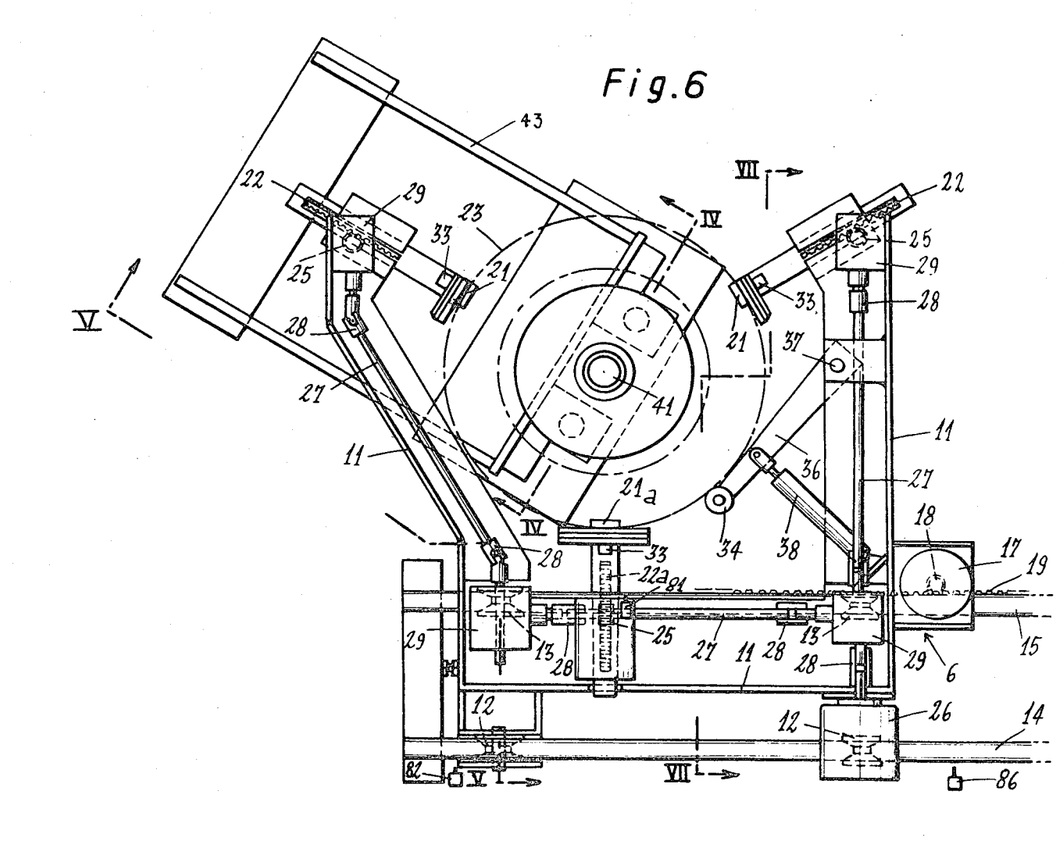
FIG. 6 is a plan view of the apparatus of FIGS. 4 and 5.
Figure 7:
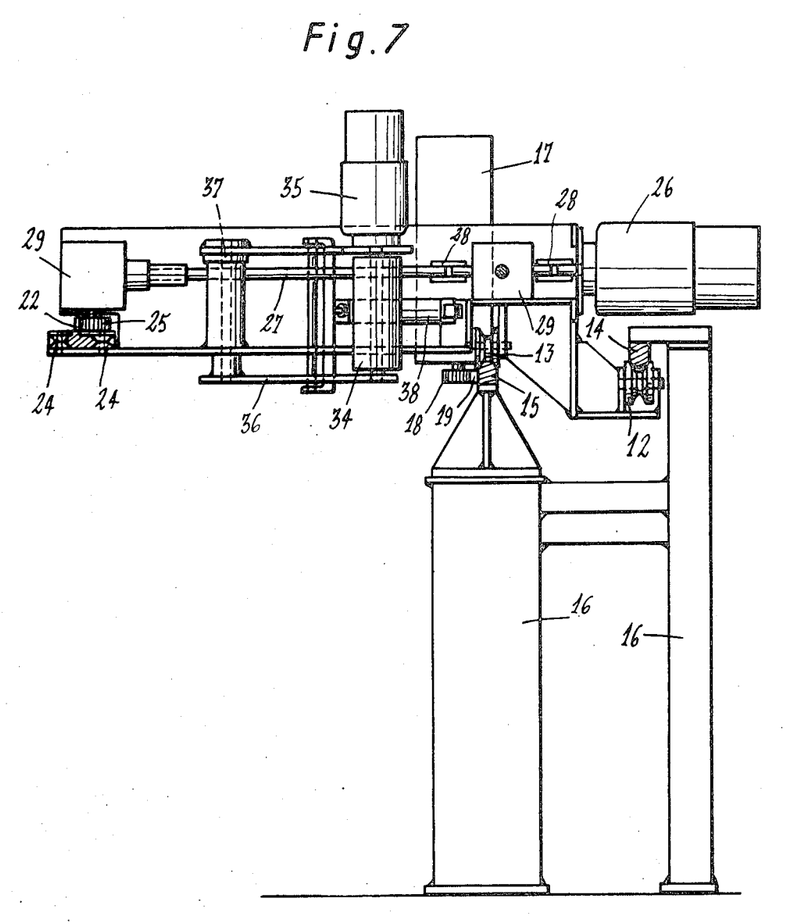
FIG. 7 is a partial view taken along line VII—VII of FIG. 6.

The handling carriage 6 comprise a frame 11 constructed of structural steel members (shown in FIG. 6) which support the gripping device 5. The frame 11 supports rollers 12, 13 which run along two parallel rails 14, 15 disposed at right angles to the conveyors 2 and 3 and carried by pillars 16 of masonry (as shown in FIG. 7). The rollers 12 are mounted so as to run along the underface of the rail 14 (as shown in FIG. 5) whilst the rollers 13 run along the top face of the rail 15 so as to balance the tilting couple which results from the fact that the center of gravity of the carriage 6 and of the gripping device 5 is located outside the surface comprised between the rails 14 and 15. The carriage 6 is driven by a translational-motion braking motor 17 (shown in FIGS. 6 and 7), the vertical shaft of which carries a pinion 18 disposed in meshing engagement with a rack 19 which is mounted along the rail 15.

The gripping device 5 comprises three jaws 21 disposed at intervals of 120° relative to each other and rigidly coupled for translational motion with racks 22 which are caused to move radially with respect to the pneumatic tire 23 in order that the three jaws 21 may be maintained continuously at the same distance from the axis of said tire. One of said racks, namely the rack 22a corresponding to the jaw 21a, is oriented at right angles to the rails 14 and 15 and consequently parallel to the direction of displacement of the conveyors 2 and 3.

The racks 22 are guided by rollers 24 and each engage with a pinion 25. The three pinions 25 are driven in rotation by a motor 26 which actuates intermediate shafts 27 by means of universal joints 28 and bevel-drive units 29.

The extremity of each rack 22 carries a vertical arm 31 (as shown in FIG. 5) to which is pivotally coupled the jaw 21, said jaw being also connected to said arm 31 by means of compression springs 32. There is fixed on the arm 31 a micro-switch 33 actuated by a push-rod which is connected to the jaw 21. The three jaws 21 are located substantially at the level of the rollers of the feed conveyor 2.

The frame 11 also supports a device for driving the tire 23 in rotation while inspection is in progress. This device comprises a rubber-covered roller 24 (shown in FIGS. 6 and 7) having a vertical axis and driven in rotation by a motor 35. The roller 34 and its motor 35 are coupled to the frame 11 by means of a support 36 which is capable of pivotal motion about a vertical pin 37 and is actuated by means of a hydraulic jack 38.

Figure 4:
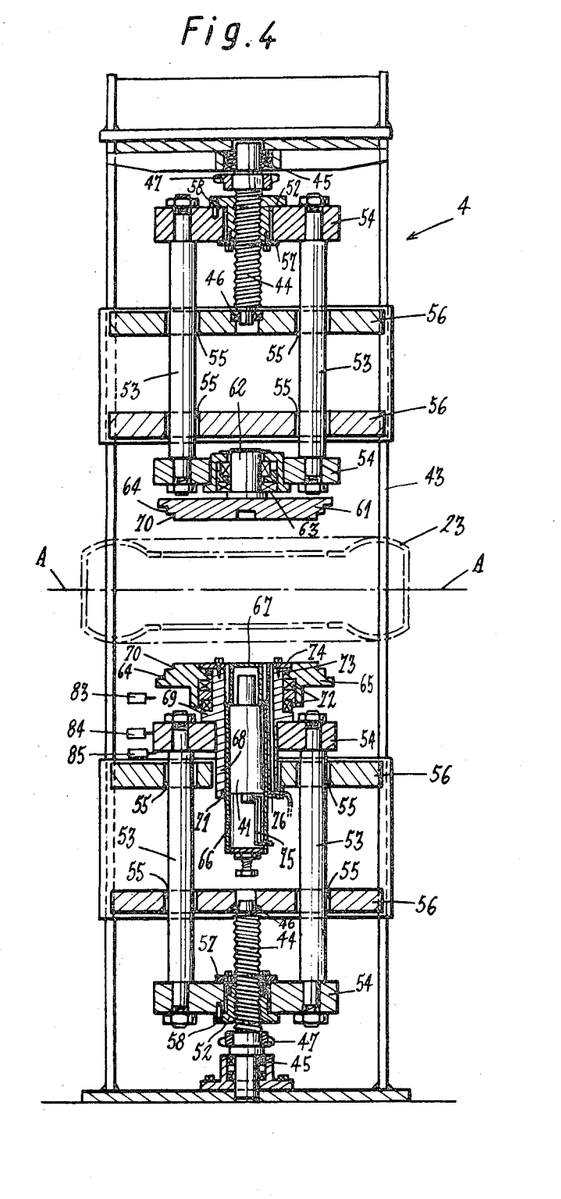
FIG. 4 is a sectional view taken along line IV—IV of FIG. 6 and showing a first embodiment of the inspection apparatus which is inclined in the equipment unit shown in FIGS. 1 to 3.

For reasons of clarity of the drawings, the carriage 6, the gripping device 5 and the device for driving the tire in rotation have not been illustrated in the view in elevation of FIG. 4.

The inspection apparatus 4 essentially comprises an X-ray generating tube 41 mounted on a machine of the mechanical press type which is equipped in addition with the devices for supporting and inflating the tire. Moreover, a screen 42 (shown in FIG. 2) which is built into one wall of the room enables an operator who is placed outside said room to carry out the inspection while being protected against hazardous radiations.

The frame 43 of the press supports two similar devices for supporting the tire 23 during the inspection operation. These two devices are placed on each side of the plane of symmetry A—A of the tire 23 in the position of inspection.

Each of these devices comprises an operating screw 44 supported by a ball-bearing 45 and a ball-thrust bearing 46, said screw being rotationally coupled to a sprocket 47 with which is engaged a chain 48, as shown in FIG. 5. The chain 48 passes over a driving sprocket 49 which is driven in rotation by a motor 51.

The operating screw 44 engages with a nut 52, said nut being rigidly fixed to a support which is capable of translational motion and comprises two guiding columns 53, said columns being secured at both ends to movable plates 54 and capable of sliding within bores 55 formed in spacer members 56 attached to the frame 43. One of the movable plates 54 is made fast for translational motion with the nut 52 since said plate is engaged between the head of said nut and a small plate 57 which is screwed into the body of the nut. A locking-pin 58 prevents rotational motion of the nut 52 so that, when the screw 44 is caused to rotate, the assembly consisting of columns 53 and plates 54 is endowed with a movement of translation parallel to the axis of the tire. The interposition of the nut 52 between the operating screw 44 and the plate 54 permits ready assembly and disassembly of said screw 44.

The second movable plate 54 of the upper supporting device carries a disc 61 which is rotatably mounted on said plate 54 by means of a stub-shaft 62 and ball bearings 63. The disc 61 is provided with an annular shoulder 64 having a diameter equal to that of the tire bead. A second shoulder 70 is provided for tires of smaller sizes.

The second movable plate 54 of the lower supporting device carries both a movable disc 65 which is similar to the disc 61 in order to support the tire 23 and the X-ray generating-tube 41.

To this end, the tube 41 is mounted in a steel sheath 66 which provides a seal against compressed-air and is closed at the top portion thereof by means of a cap 67 formed of material which also provides a seal against compressed air but is permeable to X-rays, such as duralumin or plastic material. The sheath 66 is slidably mounted within a casing 68 which is secured to the plate 54 by means of an annular flange 69. A seal 71 ensures leak-tightness with respect to compressed air between the sheath 66 and the casing 68.

By means of ball-bearings 72, the annular flange 69 is adapted to carry the disc 65, said disc being provided with an axial bore in which is engaged the upper extremity of the casing 68. A seal 73 which is held in position by means of a small plate 74 ensures leak-tightness between said casing 68 and the disc 65. In the same manner as the disc 61, said disc 65 is provided with annular shoulders 64 and 70 having diameters equal to those of the beads of the tires to be inspected. Both supporting devices are so arranged that the annular shoulders of the discs 61 and 65 remain constantly symmetrical with each other relative to the mid-plane A—A of the tire.

Electric power is supplied to the tube 41 by means of wires 75 which traverse the sheath 66 through a leak-tight lead-in bushing. In addition, a compressed-air duct 76 is arranged within the wall of the casing 68 and joined to a connector-pipe or hose 77 (shown in FIG. 5).

The lower end of the sheath 66 is connected to the operating rod of a hydraulic jack 78 (shown in FIG. 5).

The equipment unit further comprises a certain number of electric contacts which will be described hereinafter and serve to ensure automatic operation of the systems for handling the tire and positioning of the X-ray tube for the inspection operation.

The equipment unit operates as follows:

Assuming that the carriage 6 is stopped vertically opposite to the feed conveyor 2 and the three jaws 21 are in their position of maximum separation, a contact 81 (FIG. 6) which is operated by the rack 22a of the jaw 21a effects the opening of the shutter 8 (shown in FIG. 3) and starts-up the feed conveyor 2. When the tire 23 which is brought by the conveyor 2 is applied against the jaw 21a, this latter operates the corresponding contact 33 (shown in FIG. 5), thereby stopping the feed conveyor 2 and effecting the closure of the shutter 8. The same contact also initiates start-up of the motor 26 in the direction of concentric closure of the three jaws 21. When the jaws are all applied against the tire, the three contacts 33 are operated simultaneously, thereby stopping the jaw-clamping motor 26 and starting-up the motor 17 in the direction which causes the carriage 6 to advance towards the inspection apparatus.

When the carriage 6 comes into position directly above the inspection apparatus 4, said carriage operates a contact 82 (FIG. 6) which stops the motor 17 and brakes the carriage. Moreover, said contact 82 initiates start-up of the motor 51 which sets the discs 61 and 65 in translational motion and actuates an electrovalve which controls the jack 78 so as to produce the upward motion of the sheath of the X-ray tube.

The discs 61 and 65 are then applied against the tire 23, the annular shoulders 64 of said discs being intended to perform the function of rims and being adapted to fit within the beads of the tire in order to define with this latter an enclosure which affords pressure-tightness with respect to the compressed air. The cap 67 of the sheath of the X-ray tube projects into the interior of said enclosure beyond the casing 68. One of the plates 54 then operates a contact 83 (shown in FIG. 4) which causes the motor 51 to stop and causes the motor 26 to rotate for a short time in order to move the jaws 21 away from the tire 23. The contact 83 is positioned as a function of the axial dimension of the tire.

Said contact 83 also supplies an electrovalve which initiates the admission of compressed air into the interior of the tire through the duct 76 and the connector-pipe 77. Said pipe is fitted with a contact pressure-gage (not shown) which, when the pressure within the tire attains the desired value of the order of 2 kg/cm$^2$, stops the inflation of the tire and energizes an electrovalve which effects the supply of the jack 38 (shown in FIGS. 6 and 7). This jack then brings and maintains the roller 34 applied against the tire 23 in the position shown in FIG. 6. The circuit for supplying the jack 38 comprises a pressure gage (not shown) which, when the roller 34 is applied against the tire, closes safety contacts which are inserted in the circuits for supplying current to the motor 35 which drives the roller 34 in rotation and to the X-ray tube 41 in order to permit manual control of said tube and said motor. The operator who is stationed outside the room is warned by means of a light signal that he may begin the inspection operation.

The operator is provided with manual control knobs in order to control the supply of the X-ray tube and the start-up, either in one direction or in the other, of the motor 35 which drives the tire in rotation by means of the roller 34. It is therefore possible to transfer the tread and the metallic belt of the tire through the X-ray beam at constant speed, to stop the rotation in order to examine a particular region of this tire in detail and to move backwards in order to proceed to a further inspection of certain parts.

When the inspection is completed, the operator stops the supply of the X-ray tube and of the motor 35 which drives the tire in rotation, and initiates the tire-discharge cycle by means of a manual control knob (not shown in the drawings).

This knob controls three electrovalves which cause respectively the outward displacement of the roller 34 with respect to the tire by means of the jack 38, the downward motion of the X-ray tube by means of the jack 78 and the deflation of the tire.

When the tire is deflated, the contact pressure-gage which is mounted on the connector-pipe 77 causes the motor 51 to start-up in the direction which results in separation of the discs 61 and 65. After the discs have released the tire, the plate 54 actuates a contact 84 (shown in FIG. 4) which stops the translational motion of the discs in order to enable the gripping device to take hold of the tire. This contact 84 also causes the motor 26 to start-up in order to initiate closure of the jaws 21. The motor 26 is then stopped by means of the contacts 33 which are operated by the jaws (see FIG. 5). One of the three contacts 33 then causes the motor 51 to start-up again and the discs 61 and 65 resume their translational motion until the plate 54 operates a contact 85 which stops the movement of said discs and causes the carriage motor 17 to start-up in the direction which brings the carriage 6 towards the discharge conveyor 3.

Figure 1:
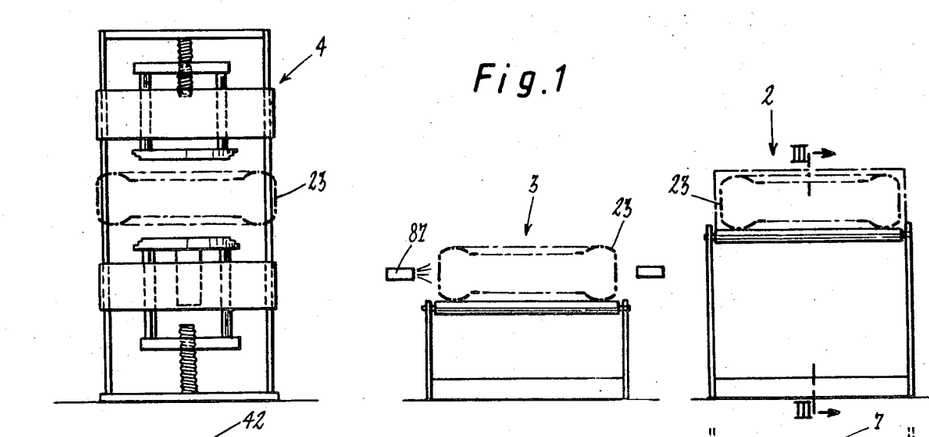
FIG. 1 is a diagrammatic view in elevation showing the equipment unit in accordance with the invention.

When the carriage has brought the tire into position vertically above the discharge conveyor 3, a contact 86 (shown in FIG. 6) stops the carriage and starts-up the motor 26 in the direction which causes the jaws 21 to open. The tire then drops onto the conveyor 3 which takes this latter away from the inspection room. During the course of its travel, the tire cuts-off the light ray which shines on a photoelectric cell 87, thereby again starting-up the carriage motor 17. Translational motion of the carriage is then resumed until this latter has come into position directly above the feed conveyor 2 in which a contact 88 (shown in FIG. 1) stops the motor 17. When the jaws 21 are fully open, the contact 81 again initiates the opening of the shutter 8 and the cycle begins again.

Figure 8:
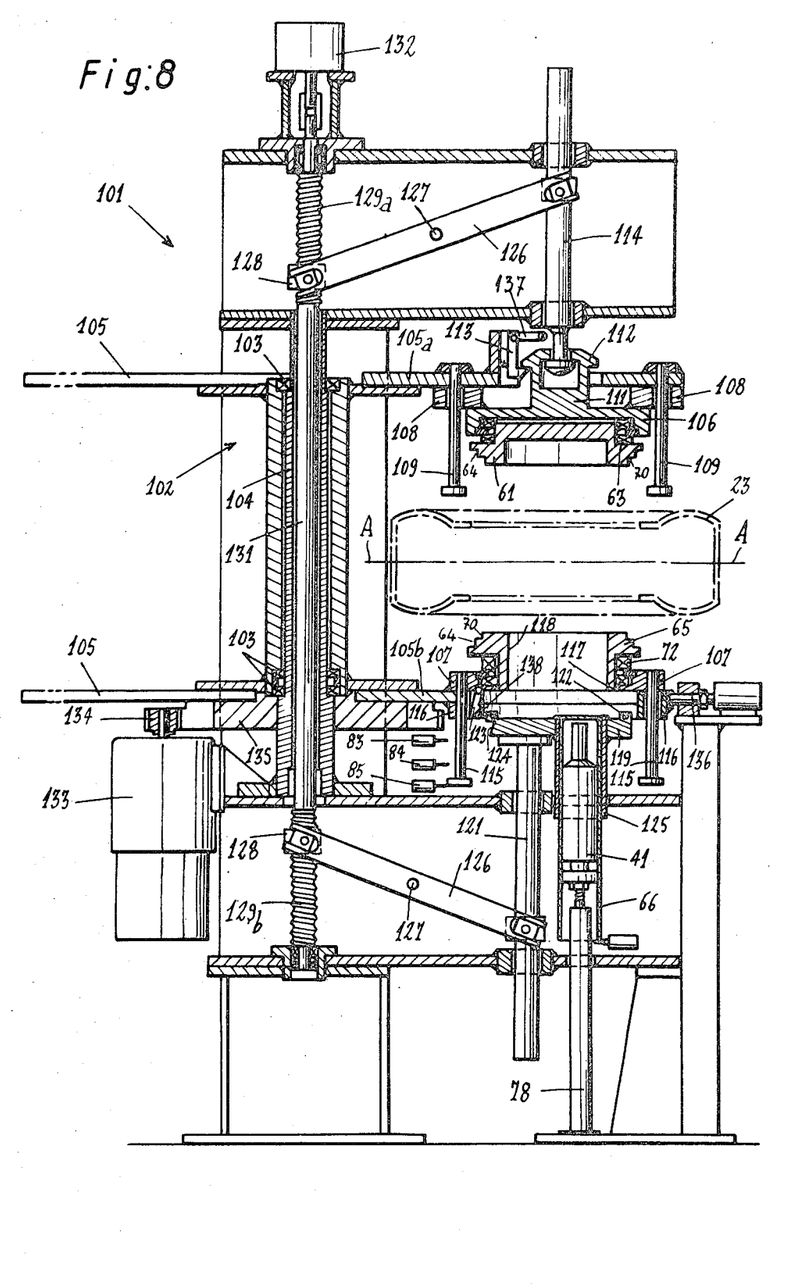
FIGS. 8 to 10 are views which are similar to FIGS. 4 to 6 and correspond to a second embodiment of the inspection apparatus.
Figure 9:
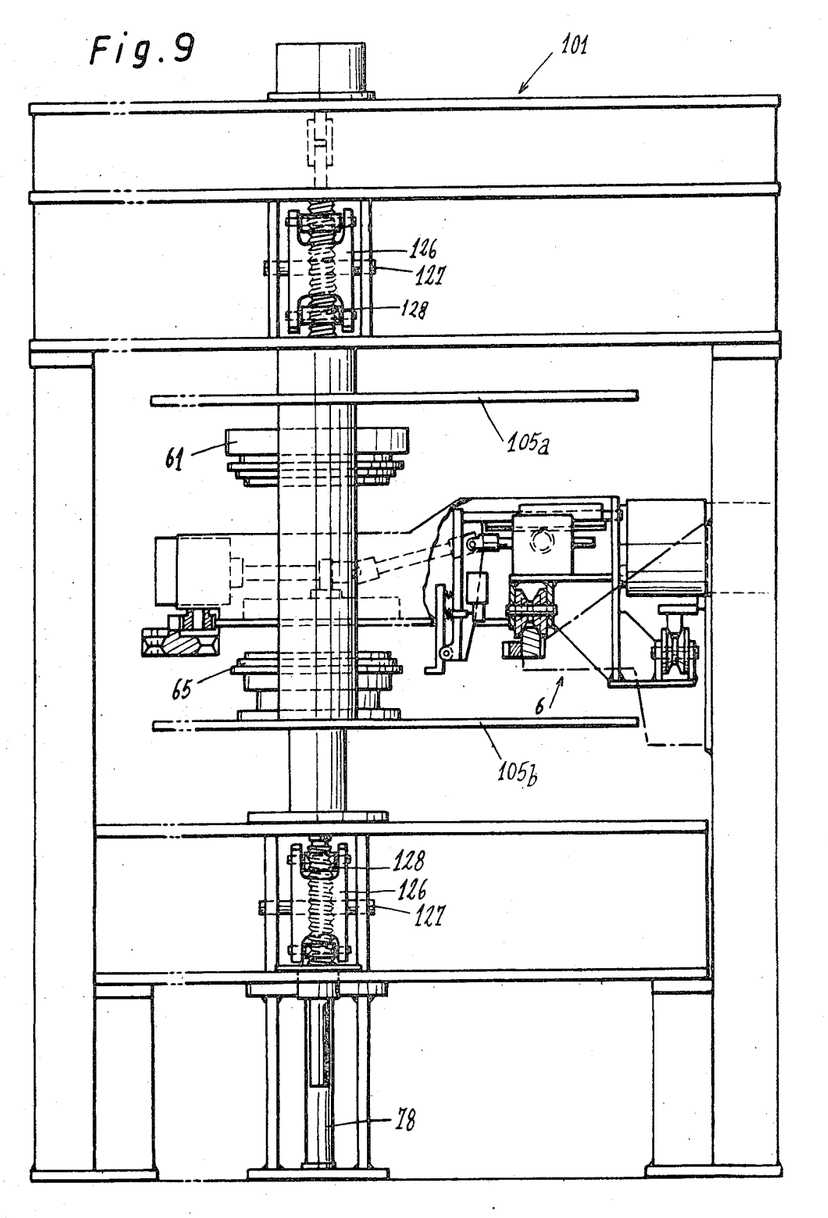
Figure 10:
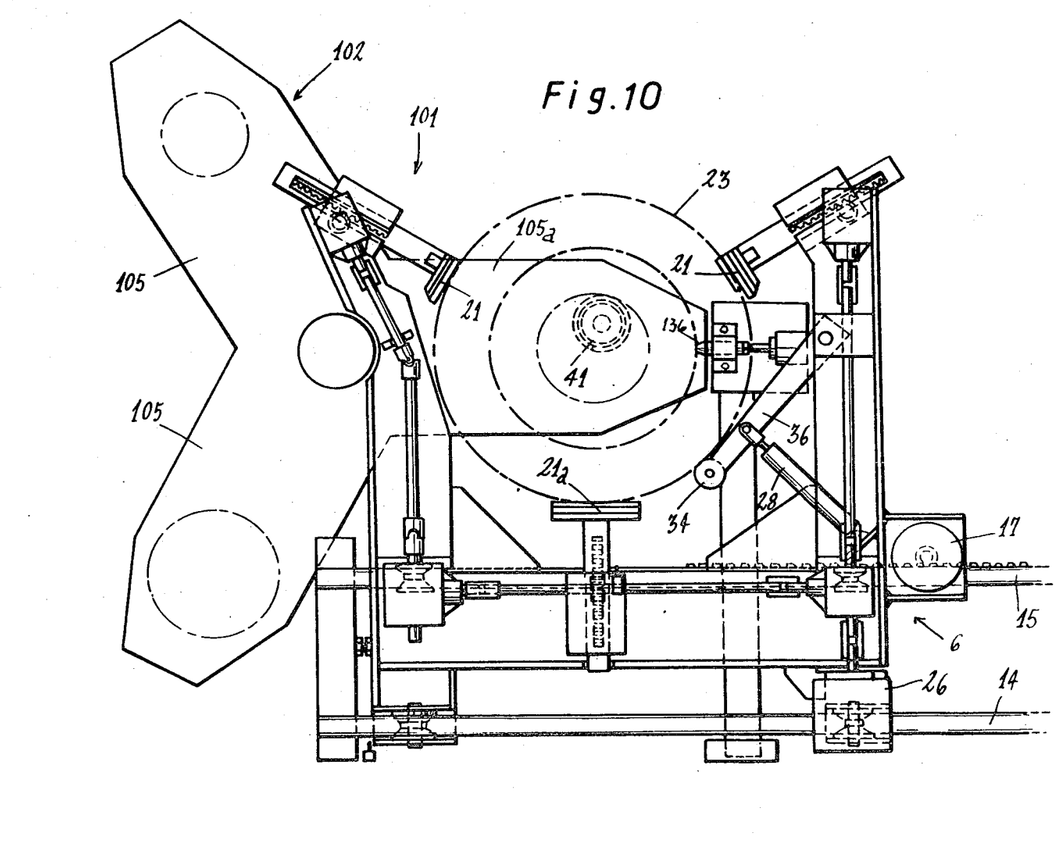

It has been seen that the discs 61 and 65 can be adapted to tires having two different radial sizes. The inspection apparatus 101 which is illustrated in FIGS. 8 to 10 is suited to a large number of tire sizes. In these figures, the same elements as in the preceding figures are designated by the same reference numerals.

The inspection apparatus 101 comprises a drum 102 mounted by means of ball bearings and ball-thrust bearings 103 (shown in FIG. 8) around a vertical sleeve 104 which forms part of the frame of the apparatus. The drum 102 comprises a certain number of sets of arms 105 which are angularly spaced at uniform intervals around the sleeve 104. In the embodiment shown, the drum has three sets of arms spaced at intervals of 120°. Each set comprises two arms such as the arm 105a and the arm 105b (as shown in FIGS. 8 and 9)

which are symmetrical with each other relative to the mid-plane A—A of the tire in the inspection position. Each arm 105 comprises a disc-carrier 106, 107 adapted to slide parallel to the axis of the tire with respect to said arm. A tire-supporting disc 61, 65 is rotatably mounted with respect to said disc-carrier. The discs 61, 65 are each provided with two annular shoulders 64, 70 which can be adapted to the beads of tires having two different radial dimensions. The shoulders of the two discs which are mounted on a same set of arms obviously have the same dimensions but each set carries discs having different dimensions from one set to the other. The machine which is illustrated can thus accommodate six different sizes of tires, that is to say practically all the standard tire sizes between 10 inches and 15 inches (254 to 381 millimeters).

The disc-carrier 106 corresponding to the upper arm 105a has two lugs 108 which slide along small columns 109 (as shown in FIG. 8). The disc-carrier 106 further comprises a central hub 111 which passes through an orifice formed in the arm 105a of the drum, said hub being provided with an annular flange 112 beneath which is engaged a catch 113. The hub 111 is also provided with a groove in which is engaged the extremity of an operating rod 114 when the arm 105a is brought into the service position as a result of rotation of the drum 102.

The disc-carrier 107 corresponding to the lower arm 105b is of annular shape and has two small guiding columns 115 which are adapted to slide within two sleeves 116 attached to the arm 109b. A seal 117 is mounted between the disc-carrier 107 and the disc 65. Said disc 65 is also annular and has a central bore 118.

The arm 105b has a bore through which a push-plate 119 mounted at the extremity of an operating rod 121 is permitted to pass. Said push-plate comprises a seal 122 which is applied against the disc-carrier 107 when the discs 61 and 65 are brought towards each other in order to hold the tire during inspection. The disc-carrier 107 is further provided with a catch 123 which is engaged in a recess 124 of the push-plate 119 during translational motion of the discs.

In this embodiment also, the X-ray tube 41 is mounted within a pressure-tight sheath 66 and this latter is slidably mounted within a casing 125 which extends in pressure-tight manner through the push-plate 119.

The two operating rods 114 and 121 are actuated by means of connecting-arms 126 each pivotally mounted on a stationary pin 127 and displaced by means of nuts 128 adapted to engage with a threaded end 129a, 129b of a control rod 131 which passes within the interior of the sleeve 104. The rod is driven in rotation by a motor 132.

The drum 102 is driven in rotation by a motor 133 by means of a pinion 134, said pinion being in mesh with a toothed ring 135 which is rigidly fixed to the drum. A locking-bolt 136 is provided so as to retain the arm 105b which has been selected as a function of the size of the tire to be inspected.

A television camera (not shown) enables the operator to identify the size of the tire to be inspected before this latter passes into the inspection room. The operator can then select the appropriate set of arms 105 and bring these latter into the service position by operating the motor 133. This can clearly be carried out automatically by means of programs which are selected by the operator.

The operations then take place as described in the foregoing. In this second embodiment, the contacts 83, 84, 85 are operated by one of the small guiding columns 115. When the movement of closure of the discs 61 and 65 is initiated, the upper operating rod 114 first releases the disc-carrier 111 and produces action on an arm 137 of the catch 113. In addition, the lower operating rod 121 applies the push-plate 119 against the disc-carrier 107 in pressure-tight manner by virtue of the seal 122. The catch 123 then engages in the recess 124 in order to ensure clamping of the seal 122. During the movement in the opposite direction, the catch 123 is released by means of an abutment member 138 which is carried by the drum arm.

As will be readily understood, the invention is not limited to the embodiments which have just been described and many alternative forms of construction can accordingly be contemplated without thereby departing from the scope of this invention. In particular, it would be possible either to reduce or to increase the number of annular shoulders provided on the discs 61 and 65 as well as the number of sets of arms of the drum.

What is claimed is:

1. An equipment unit for the X-ray inspection of pneumatic tires, including an inspection apparatus which comprises movable discs for supporting a tire to be inspected, a device for driving the tire in rotation about its axis and a tube for generating X-rays, wherein the movable discs are adapted to fit respectively within each tire bead in the inspection position so as to define with said tire an enclosure which is leak-tight with respect to compressed air, wherein the tube for generating X-rays is mounted within the interior of a sheath which is leak-tight with respect to compressed air and at least part of which is permeable to X-rays, said sheath being adapted to slide parallel to the axis of the tire and to pass through one of the discs in such manner as to afford leak-tightness with respect to compressed air, and wherein a compressed-air duct is adapted to traverse the disc aforesaid in leak-tight manner.

2. An equipment unit as claimed in claim 1, wherein the sheath containing the X-ray generator is adapted to slide in leak-tight manner with respect to compressed air within a casing which is rigidly fixed for translational motion to one of the discs and passes through said disc in leak-tight manner with respect to compressed air, and wherein the compressed-air duct is disposed within the wall of said casing.

3. An equipment unit as claimed in claim 1, wherein each disc is rotatably mounted with respect to a support which is displaceable in translational motion, a device being provided for driving said two supports simultaneously in translational motion and said device being so arranged that said supports remain symmetrical with each other with respect to the mid-plane of the tire in the position of inspection.

4. An equipment unit as claimed in claim 1, and comprising a tire-feed conveyor, a tire-gripping device mounted on a handling carriage adapted to transport the tires from the feed conveyor to the inspection apparatus and from said inspection apparatus to a discharge conveyor, wherein the gripping device comprises a plurality of angularly spaced jaws adapted to slide in a radial direction with respect to the tire, and a system for actuating said jaws which is so arranged that the distances between the axis of the tire and each of said jaws should remain equal to each other.

5. An equipment unit as claimed in claim 4, wherein the device for driving the tire in rotation comprises a roller having an axis parallel to the axis of the tire in the inspection position and rotatably mounted on a support which is pivotally mounted on the frame of the gripping device.

6. An equipment unit as claimed in claim 1, wherein said unit comprises a drum rotatably mounted with respect to a stationary shaft of the inspection apparatus, said drum being provided with a number of sets in angularly spaced relation of two arms which are symmetrical with each other relative to the mid-plane of the tire in the inspection position and each carry a disc for supporting the tire, and wherein the discs which are carried respectively by each set of two arms have diameters which are different from each other.

7. An equipment unit as claimed in claim 6, wherein each arm of the drum comprises a support on which a disc is rotatably mounted, said support being adapted to slide with respect to the drum arm in a direction parallel to the axis of the tire.

8. An equipment unit as claimed in claim 7 wherein, in each of the sets of two arms of the drum, a disc has an axial bore and is rotatably mounted with respect to its sliding support in such manner as to ensure leak-tightness for compressed air.

9. An equipment unit as claimed in claim 8, wherein the inspection apparatus comprises a single device for driving the discs in translational motion and wherein the device for driving the disc which is mounted in leak-tight manner comprises a push-plate adapted to be applied against the sliding support of said disc in such manner as to ensure leak-tightness for compressed air.

10. An equipment unit as claimed in claim 9, wherein the sheath containing the X-ray generator is adapted to slide in leak-tight manner with respect to compressed air within a casing which is secured in leak-tight manner to the push-plate of the device for driving in translational motion and which passes through said push-plate.

* * * * *